(12) United States Patent
Mellar et al.

(10) Patent No.: US 12,258,955 B2
(45) Date of Patent: Mar. 25, 2025

(54) PISTON ASSEMBLY FOR AN UNLOADER VALVE OF AN AIR COMPRESSOR

(71) Applicant: KNORR-BREMSE Systeme fuer Nutzfahrzeuge GmbH, Munich (DE)

(72) Inventors: Joerg Mellar, Ebersberg (DE); Jean-Baptiste Marescot, Manerbe (FR); Bertrand Chirot, Auberville (FR); Arnaud Chazelles, Saint Sebastian sur Loire (FR); Jean-Louis Mezza, Marolles (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 543 days.

(21) Appl. No.: 17/594,121

(22) PCT Filed: Apr. 2, 2020

(86) PCT No.: PCT/EP2020/059414
§ 371 (c)(1),
(2) Date: Oct. 4, 2021

(87) PCT Pub. No.: WO2020/201429
PCT Pub. Date: Oct. 8, 2020

(65) Prior Publication Data
US 2022/0154713 A1 May 19, 2022

(30) Foreign Application Priority Data
Apr. 5, 2019 (EP) ..................................... 19167506

(51) Int. Cl.
*F04B 49/03* (2006.01)
*B60T 17/02* (2006.01)
(Continued)

(52) U.S. Cl.
CPC .............. *F04B 49/03* (2013.01); *B60T 17/02* (2013.01); *F04B 39/06* (2013.01); *F04B 53/10* (2013.01)

(58) Field of Classification Search
CPC .......... F04B 49/03; F04B 39/06; F04B 53/10; B60T 17/02
See application file for complete search history.

(56) References Cited

U.S. PATENT DOCUMENTS 2,126,799 A * 8/1938 Myers ....................... F16K 1/38
123/188.8
4,321,940 A * 3/1982 Krechel .................. F16K 15/00
137/514.7
(Continued)

FOREIGN PATENT DOCUMENTS

| CA | 1113058 A | 11/1981 |
|---|---|---|
| CA | 2095772 A1 | 12/1993 |

(Continued)

OTHER PUBLICATIONS

English Machine Translation of JP-2000320724-A (Year: 2000).*
(Continued)

*Primary Examiner* — Nathan C Zollinger
(74) *Attorney, Agent, or Firm* — Crowell & Moring LLP (57) ABSTRACT

A piston assembly for an unloader valve of an air compressor includes an unloader piston having an end portion with a first bore of a first bore diameter, an intermediate portion with a second bore of a second bore diameter and an opposite end portion with a third bore of a third bore diameter; a coil spring having a central opening, one end portion disposed in the second bore of the unloader piston and an opposite end portion extending into the first bore of the unloader piston; and a balance piston including a head portion having a diameter to be disposed in the first bore of the unloader piston, and a stem portion extending from the (Continued)

head portion into the central opening of the coil spring and having a diameter smaller than the diameter of the head portion. The diameter of the stem portion at an end portion facing away from the head portion substantially corresponds to an inner diameter of the central opening of the coil spring. The balance piston includes a heat protection element.

14 Claims, 5 Drawing Sheets

(51) Int. Cl.
*F04B 39/06* (2006.01)
*F04B 53/10* (2006.01)

(56) References Cited

U.S. PATENT DOCUMENTS

| | | | | |
|---|---|---|---|---|
| 6,053,713 | A * | 4/2000 | Brown | F04B 39/064 |
| | | | | 417/571 |
| 9,651,040 | B2 * | 5/2017 | Colavincenzo | B60T 17/04 |
| 9,994,207 | B2 * | 6/2018 | Yeats | F04B 39/10 |
| 10,036,376 | B2 * | 7/2018 | Mitsch | F04B 39/122 |
| 10,746,300 | B2 * | 8/2020 | Yeats | F16J 1/10 |
| 2004/0040601 | A1 * | 3/2004 | Koelzer | F04B 49/022 |
| | | | | 137/522 |
| 2005/0194046 | A1 | 9/2005 | Koelzer | |
| 2009/0220364 | A1 | 9/2009 | Rigal et al. | |
| 2015/0308426 | A1 | 10/2015 | Colavincenzo et al. | |
| 2017/0037843 | A1 | 2/2017 | Yeats et al. | |
| 2019/0211938 | A1 * | 7/2019 | Hebrard | F16K 15/023 |

FOREIGN PATENT DOCUMENTS

| | | | | | |
|---|---|---|---|---|---|
| CN | 1757961 | A | | 4/2006 | |
| CN | 1788163 | A | | 6/2006 | |
| CN | 101421514 | A | | 4/2009 | |
| CN | 102913433 | A | | 2/2013 | |
| CN | 205445951 | U | | 8/2016 | |
| DE | 10 2010 038 064 | A1 | | 4/2012 | |
| DE | 10 2016 114 436 | A1 | | 2/2017 | |
| EP | 0 240 278 | A2 | | 10/1987 | |
| EP | 0 371 396 | A2 | | 6/1990 | |
| GB | 2319569 | A | * | 5/1998 | ............ F04B 49/022 |
| GB | 2323639 | A | * | 9/1998 | ............. F04B 49/24 |
| JP | 2000320724 | A | * | 11/2000 | |
| TW | 223140 | B | | 5/1994 | |
| WO | WO 2016/164400 | A1 | | 10/2016 | |
| WO | WO 2016/167998 | A1 | | 10/2016 | |

OTHER PUBLICATIONS

International Search Report (PCT/ISA/210) issued in PCT Application No. PCT/EP2020/059414 dated Jun. 5, 2020 (four (4) pages).
Written Opinion (PCT/ISA/237) issued in PCT Application No. PCT/EP2020/059414 dated Jun. 5, 2020 (six (6) pages).
Extended European Search Report issued in European Application No. 19167506.5 dated Sep. 6, 2019 (eight (8) pages).
Chinese-language Office Action issued in Chinese Application No. 202080026910.0 dated Mar. 13, 2023 with English translation (15 pages).
Hindi-language Office Action issued in Indian Application No. 202137041540 dated Mar. 16, 2022 with English translation (five (5) pages).
Portuguese-language Office Action issued in Brazilian Application No. BR112021017922-4 dated Apr. 15, 2024 with partial English translation (5 pages).

* cited by examiner

PISTON ASSEMBLY FOR AN UNLOADER VALVE OF AN AIR COMPRESSOR

BACKGROUND AND SUMMARY OF THE INVENTION

The present application relates to a piston assembly for an unloader valve of an air compressor, the piston assembly comprising an unloader piston having an end portion with a first bore of a first bore diameter, an intermediate portion with a second bore of a second bore diameter and an opposite end portion with a third bore of a third bore diameter, wherein the first bore diameter is larger than the second bore diameter which, in turn, is larger than the third bore diameter; a coil spring having a central opening, one end portion disposed in the second bore of the unloader piston and an opposite end portion extending into the first bore of the unloader piston; and a balance piston including a head portion having a diameter to be disposed in the first bore of the unloader piston, and a stem portion extending from the head portion into the central opening of the coil spring and having a diameter smaller than the diameter of the head portion. The present application further relates to an unloader valve for an air compressor comprising such a piston assembly and an air compressor such as a vehicle air compressor used in an air braking system for a heavy vehicle like a truck.

An air braking system as used in a utility vehicle includes a vehicle air compressor which builds air pressure for the air braking system. A pressure control system, such as an air treatment device or a governor, controls system air pressure between a preset maximum and minimum pressure level by monitoring the air pressure in a supply reservoir. When the supply reservoir air pressure becomes higher than that of a preset "cut-out" setting of the governor, the governor controls the compressor to stop the compressor from building air. As the supply reservoir air pressure drops a preset "cut-in" setting of the governor, the governor returns the compressor back to building air.

The vehicle air compressor is typically a reciprocating air compressor and runs continuously. The compressor runs either in a loaded mode or an unloaded mode. When the compressor is running in the loaded mode, compressed air is delivered to the air braking system. When the compressor is running in the unloaded mode, compressed air is directed to an alternate place different from the air braking system. Also, when the compressor is running in the unloaded mode, an unloader valve included in the compressor releases pressurized air building up inside the compressor to reduce the pressurized air in the compressor, which in turn reduces the load on the device driving the compressor. This reduces power consumption during operation of the compressor in the unloaded mode.

WO 2016/164400 A1 discloses one type of the unloader valve which includes a balance piston having a stem portion which extends into central opening of a coil spring which, in turn, extends into a bore of an unloader piston. Unadvantageously, in such a system, premature wear, particularly of the balance piston, as well as a compressor overheating and compressor piston seizing occurred.

Accordingly, it is an object of the invention to provide a piston assembly for an unloader valve in an air compressor, an unloader valve comprising such a piston assembly as well as an air compressor comprising such an unloader valve, improving the performance, particularly regarding the energy saving efficiency, of such an air compressor and avoiding overheating problems, premature wear and seizing.

The object of the invention is solved by the subject-matter of the independent claims. Advantageous embodiments are defined in the dependent claims.

In accordance with one aspect of the invention, the stem portion of the balance piston of the piston assembly has a diameter at an end portion facing away from the head portion substantially corresponding to an inner diameter of the central opening of the coil spring and the balance piston includes a heat protection means.

The coil spring is stabilized by the diameter of the end portion facing away from the head portion in such a way that vibrations of the coil spring, especially vibrations caused by a pressure differential along the length of the coil spring are reduced. By reducing such vibrations, wear between the coil spring and the stem portion of the balance piston is reduced. The heat protection means reduces heat transfer to the head portion. By this, overheating of the compressor as well as seizing of the same is avoided, without affecting the energy efficiency in a negative way. Further, other heat-sensitive components disposed in the head portion, e.g. seals, are protected from getting overheated.

In accordance with another aspect of the invention, the unloader valve comprises the piston assembly according to the first aspect, wherein the unloader piston is responsive to a control signal pressure to move the unloader piston against bias of the coil spring and thereby move the unloader piston along its longitudinal central axis from a loaded position in which the unloader piston blocks an associated unloading passage to an unloaded position in which the unloader piston is not blocking the unloading passage.

In accordance with still another aspect of the invention, the vehicle air compressor comprises a compressor crankcase assembly, a compressor cylinder head assembly disposed on the crankcase assembly and co-operating with the crankcase assembly to generate compressed air, and the unloader valve assembly according to the other aspect of the invention connected internally of the crankcase and cylinder head assemblies. The head assembly includes an air inlet port through which air can be received for compression within the crankcase and cylinder head assemblies, a discharge port through which compressed air can be delivered from the cylinder head assembly, and an unloading passage. The unloader piston of the unloader valve assembly is movable against biasing force of the coil spring between the loaded position in which compressed air is blocked from leaving the unloading passage as compressed air is being delivered through the discharge port and the unloaded position in which compressed air is allowed to be unloaded from the crankcase and the cylinder head assemblies.

As the compressor piston operates back and forth during the loaded mode, air flows back-and-forth between two chambers of the unloader valve. The back-and-forth movement of air flow into and out of the bore of the unloader piston takes a finite amount of time to travel up and down the individual coils of the spring, resulting in a pressure differential along the length of the spring. This pressure differential along the length of the spring can cause the spring to vibrate. The diameter of the end portion facing away from the head portion stabilizes the coil spring in such a way that such vibrations of the coil spring are reduced. By reducing such vibrations, wear between the coil spring and the stem portion of the balance piston as well as at the seat in the valve plate of the unloader piston is reduced. The heat protection means reduces heat transfer to the head portion avoiding overheating of the compressor as well as seizing of the same without affecting the energy efficiency in a negative way.

Exemplary further embodiments are defined in the dependent claims and are explained further below.

In one embodiment, the heat protection means may comprise a grooved section between an end portion extending from the head portion and the end portion facing away from the head portion and a heat shield formed by the end portion facing away from the head portion. The grooved section has a reduced diameter that reduces the heat transfer through the stem portion towards the head portion of the balance piston. The end portion (of the stem portion) facing away from the head portion has a diameter larger than the grooved section, preferably the same size as the diameter of the end portion extending from the head portion. In such a piston assembly, two kinds of heat transfer from compressed air to the unloader parts can be distinguished: convection, which describes the heating of a part of the assembly due to contact with hot air; and thermal radiation, which describes electromagnetic radiation from an object related to its temperature. The end portion facing away from the head portion acts as a heat shield, particularly against thermal radiation. The grooved section reduces a third kind of heat transfer, the heat conduction in the part, particularly in the stem portion towards the head portion of the unloader valve. By this, the heat transfer towards the head portion of the balance piston is further reduced.

The stem portion of this embodiment may further include an intermediate portion interconnecting the end portion extending from the head portion and the end portion facing away from the head portion, both end portions having a first diameter, e.g. 9.0 mm, and the intermediate portion having a second diameter which is smaller than the first diameter, e.g. 7.8 mm. Such a sectional reduction of the stem portion diameter increases the radial clearance for the coil spring, e.g. from 2.75 mm to 3.75 mm and thereby reduces, preferably eliminates, the wear of the spring.

It is also possible that the heat protection means may comprise a cap made of a high temperature resistant material disposed at the end portion facing away from the head portion and/or a disc made of a high temperature resistant material with low heat conductivity disposed at the head portion of the balance piston. The cap at the end portion facing away from the head portion can analogously act like a heat shield and heat conduction limiter as described above.

The cap may be attached to the end portion facing away from the head portion, e.g. clipped, screwed, bonded, press-fitted etc., or may be integrally formed with this end portion. The disc may analogously act like a heat shield, wherein the disc is disposed between a seal disposed in the head portion and the stem portion. For example, the disc can be disposed between one end face of the head portion and the end portion of the stem portion extending from the head portion.

As the high temperature resistant material, a high temperature resistant plastic, preferably polyether ether ketone (PEEK) may be used. Plastic is a light weight material and therefore particularly suitable for reducing the weight of the piston assembly.

In another embodiment, the heat protection means may comprise a cooling line or a cooling channel integrated into the balance piston for cooling the balance piston from the inside, so to say. For example, the cooling line is co-axially arranged to the balance piston and extends through the head portion and into the stem portion. The cooling line may have a first bore of a first diameter in the area of the head portion and a second bore of a second diameter extending from the first bore along a central axis of the cooling line into the stem portion, the second diameter being smaller than the first diameter.

The cooling line may be filled with a cooling fluid, e.g. a coolant or water. For example, the cooling liquid can be supplied from a cooling fluid circuit and returned to the same.

In all embodiments described above, the length of the stem portion may be at least 50% of the length of the coil spring and up to 95%, preferably 60% to 90%, more preferably 70% to 80%. By this, the stem portion provides sufficient support for the coil spring to avoid buckling of the spring.

If the intermediate portion exists, the intermediate portion may be at least half of the length of the stem portion and up to 80% of the length of the stem portion, preferably 55% to 75%, more preferably 60% to 70%. The intermediate portion increases the spring clearance which reduces or eliminates the wear between the spring and the stem portion, but can also increase the risk of spring-buckling. Thus, for setting the length of the intermediate portion, both, wear reduction of the spring and sufficient support of the spring (to avoid buckling) should be taken into account.

It is also possible that the balance piston is stationary. Thus, the balance piston is the part relative to which all other parts of the piston assembly are arranged and movable. The term "stationary" means that the balance piston does not move in the axial direction, but radial movement is possible.

The piston assembly according to the invention may further comprise a first seal, e.g., disposed in a first seal cavity disposed in an outer diameter bearing surface of the head portion of the balance piston, configured to provide an air-tight seal between the outer diameter bearing surface of the head portion of the balance piston and an inner diameter bearing surface within the first bore of the unloader piston. This first seal, such as an O-ring, provides an air-tight seal to support up-and-down movement of the unloader piston relative to the (stationary) balance piston.

Further, the piston assembly may comprise a second seal, e.g., disposed in a second seal cavity disposed in a first outer diameter bearing surface of the unloader piston, configured to provide an air-tight seal between the first outer diameter bearing surface of the unloader piston and a first inner diameter bearing surface of a cylinder head of the compressor.

Furthermore, the piston assembly may comprise a third seal, e.g., disposed in a third seal cavity disposed in a second outer diameter bearing surface of the unloader piston, configured to provide an air-tight seal between the second outer diameter bearing surface of the unloader piston and a second inner diameter bearing surface of the cylinder head of the compressor.

Both, the second seal and the third seal, may be designed as O-rings and provide an air-tight seal to support up-and-down movement of the unloader piston relative to a body of a cylinder head assembly.

In the embodiments described above, the diameter of the central opening of the coil spring and the diameter of the stem portion may form a clearance fit therebetween. This guarantees that the stem portion fits into the central opening of the coil spring. The clearance fit has to be set such that the support of the coil spring by the stem portion is sufficient.

The coil spring may be arranged such that the one end portion of the coil spring abuts a surface of the unloader piston and the opposite end portion of the coil spring abuts a surface of the balance piston. Thus, the coil spring may be biased such that the biasing force pushes or holds the unloader piston in a loaded position in which the unloader piston blocks an associated unloading passage.

The piston assembly may further comprise a cover plate which is disposed on a side of the head portion opposite to the stem portion wherein the cover plate may be separated from the head portion or integrally formed with the head portion. The cover plate serves as an abutment for the positioning of the piston assembly in the cylinder head assembly. The cover plate may provide fastening means to fix the piston assembly at the cylinder head assembly. Further, the cover plate may be of a sheet metal. By the contact between the head portion of the balance piston and the cover plate, the heat dissipation from the balance piston to the outside is improved.

Hereinafter, exemplary embodiments of the invention will be described in detail with reference to the drawings.

DETAILED DESCRIPTION OF THE DRAWINGS

Figure 1:
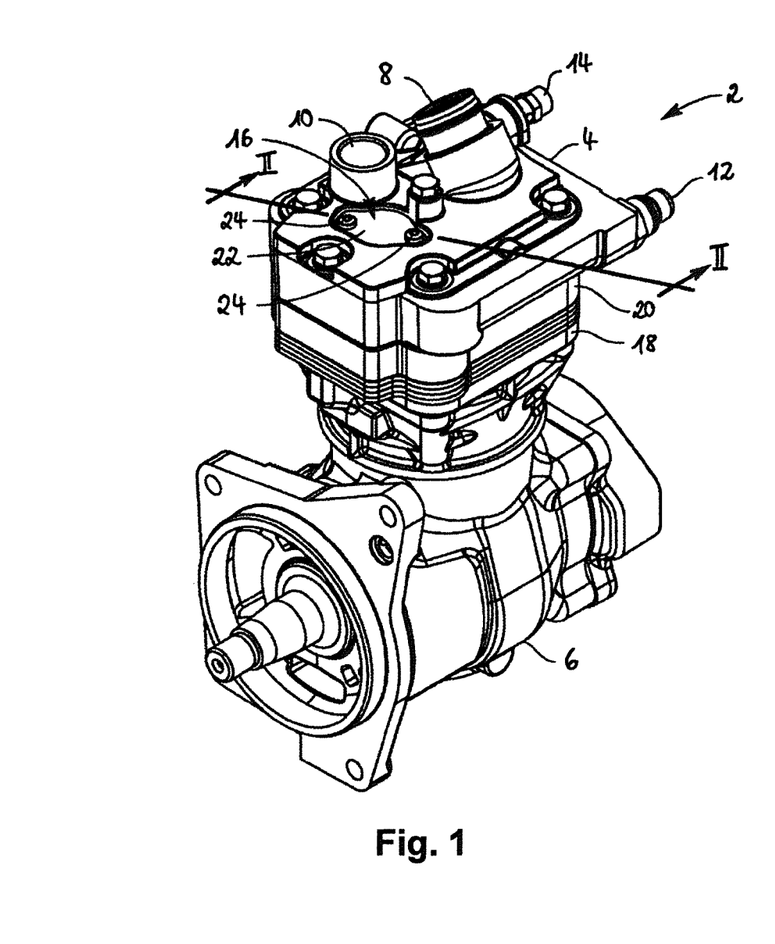
FIG. 1 is a perspective view of a vehicle air compressor including an unloader valve assembly according to an exemplary embodiment of the invention.

Referring to FIG. 1, an air compressor 2 includes a compressor cylinder head assembly 4 disposed on a compressor crankcase assembly 6 in a known manner. Components of the crankcase assembly 6 and components of the cylinder head assembly 4 co-operate together to generate compressed air.

The cylinder head assembly 4 includes an air inlet port 8 through which air can be received for compression within the crankcase assembly 6 and cylinder head assembly 4. The cylinder head assembly 4 includes a discharge port 10, i.e., an air outlet port, through which compressed air can be delivered from the cylinder head assembly 4. A pair of coolant ports 12 (only one cooling port 12 is shown in FIG. 1) is provided through which a coolant can flow to cool the cylinder head assembly 4 as compressed air is being generated. The cylinder head assembly 4 further includes a safety valve port 14, and a governor port (not shown) which is connectable via pneumatic control line (not shown) to a governor (also not shown).

The compressor 2 further includes an unloader valve assembly 16 which is disposed between the crankcase assembly 6 and cylinder head assembly 4. The unloader valve assembly 16 adjoins a valve plate 18 which, in turn, adjoins the crankcase assembly 6 and a cooling plate 20 which adjoins the cylinder head assembly 4 and is on the valve plate 18. A cover plate 22 is fastened to the cylinder head assembly 4 with a pair of fasteners, such as screws 24.

Referring to FIGS. 2 and 6 to 8, a sectional view is taken approximately along line II-II shown in FIG. 1, and each of the figures shows parts of the unloader valve assembly 16. The unloader valve assembly 16 comprises a piston assembly 26 including an unloader piston 28, a coil spring 30 and a balance piston 32.

The unloader piston 28 is generally cylindrical and movable along its longitudinal central axis 34 between a seated position (contacting the valve plate 18) shown in FIGS. 2 and 6 to 8, and an unseated position (not shown). The seated position corresponds to the compressor 2 running in a loaded mode and the unseated position corresponds to the compressor 2 running in an unloaded mode.

The unloader piston 28 has an end portion having a first bore 36 which defines a chamber 38, an intermediate portion having a second bore 40 which defines a chamber 42, and an opposite end portion having a third bore 44 which defines a chamber 46. The first bore 36 has a larger diameter than the second bore 40 which, in turn, has a larger diameter than the third bore 44.

The balance piston 32 includes a head portion 48 and a stem portion 50 which extends from the head portion 48. A diameter of the head portion 48 is larger than a diameter of the stem portion 50. The diameter of the head portion 48 is to be disposed in the first bore 36 of the unloader piston 28 and the stem portion 50 extends into a central opening 52 of the coil spring 30. The coil spring 30 is arranged in the unloader piston 28 such that one end of the coil spring 30 abuts a surface 54 of the unloader piston 28 in the chamber 42 of the second bore 40 and the opposite end portion of the coil spring 30 extends into the chamber 38 of the first bore 36 of the unloader piston 28 and abuts a surface 56 of the balance piston 32.

A first seal 58, exemplarily shown as a first O-ring, is disposed in a first seal cavity (exemplarily formed as a groove) disposed in an outer diameter bearing surface 60 of the head portion 48 of the balance piston 32. The first seal 58 provides an air-tight seal between the outer diameter bearing surface 60 of the head portion 48 of the balance piston 32 and an inner diameter bearing surface 62 within the chamber 38 defined by the first bore 36 of the unloader piston 28. Thus, the first seal 58 provides an air-tight seal to support up-and-down-movement of the unloader piston 28 relative to the balance piston 32.

A second seal 64, exemplarily shown as a second O-ring, is disposed in a second seal cavity disposed in a first outer diameter bearing surface 66 of the unloader piston 28. The second seal 64 provides an air-tight seal between the first outer diameter bearing surface 66 of the unloader piston 28 and a first inner diameter bearing surface 68 of a cylinder head of the cylinder head assembly 4 of the compressor 2.

A third seal 70, exemplarily shown as a third O-ring, is disposed in a third seal cavity disposed in a second outer diameter bearing surface 72 of the unloader piston 28. The third seal 70 provides an air-tight seal between the second outer diameter bearing surface 72 of the unloader piston 28 and a second inner diameter bearing surface 74 of the cylinder head of the cylinder head assembly 4 of the compressor 2.

The second and the third seal 64, 70 provide an air-tight seal to support up-and-down movement of the unloader piston 28 relative to a body of the cylinder head of the cylinder head assembly 4.

The balance piston 32 is used to provide a volume space into which air flows to create sufficient air pressure which pushes the unloader piston 28 downward from an unseated position (i.e., the unloaded mode of the compressor 2) towards the seated position (i.e., the loaded mode of the compressor 2). The volume space needs to be maintained at a minimum because otherwise it will impact the flow rate of the compressor 2.

When the compressor 2 is running in loaded mode, the unloader piston 28 is in the seated position shown in FIGS. 2 and 6 to 8. When the compressor 2 is running in unloaded mode, the unloader piston 28 is in an unseated position (not shown). The seated position of the unloader piston 28 will also be referred to as the loaded position, the loaded mode, or the blocking position. The unseated position of the unloader piston 28 will also be referred to as the unloaded position, the unloaded mode, or the non-blocking position.

During operation of the unloader valve assembly 16, the unloader piston 28 is responsive to a control signal pressure from a governor (not shown). The unloader piston 28 moves to the unseated position in response to the control signal pressure. The compressor 2 is then in the unloaded mode. The unloader piston 28 returns to the seated position when the control signal pressure is removed. The compressor 2 is then in the loaded mode. Compressed air from an unloading passage 76 in the valve plate 18 flows into the chambers 46, 42, 38 of the unloader piston 28. This air pressure from the unloading passage 76 assists in pushing the unloader piston 28 from the unseated position (not shown) to the seated position (shown in FIGS. 2, 6 to 8) supporting bias of the coil spring 30.

For an improved energy saving efficiency of the compressor 2, particularly in the unloaded mode, the unloading passage 76 has a diameter of 16 mm to 20 mm, for example, and the diameter of the head portion 48 substantially corresponds to the diameter of the unloading passage 76.

Figure 2:
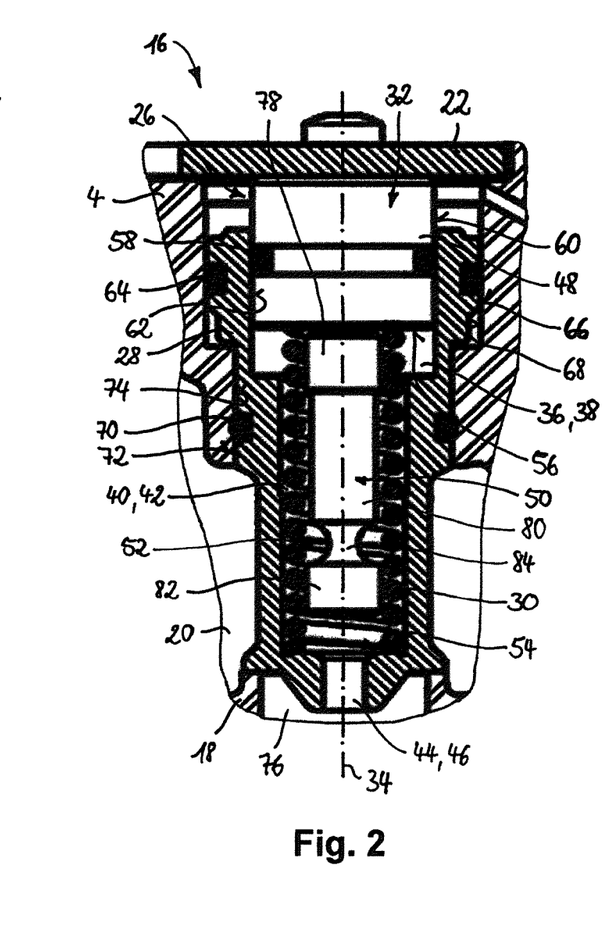
FIG. 2 is a sectional view, taken approximately along line II-II shown in FIG. 1, and showing a first embodiment of a piston assembly for the unloader valve assembly.
Figure 3:
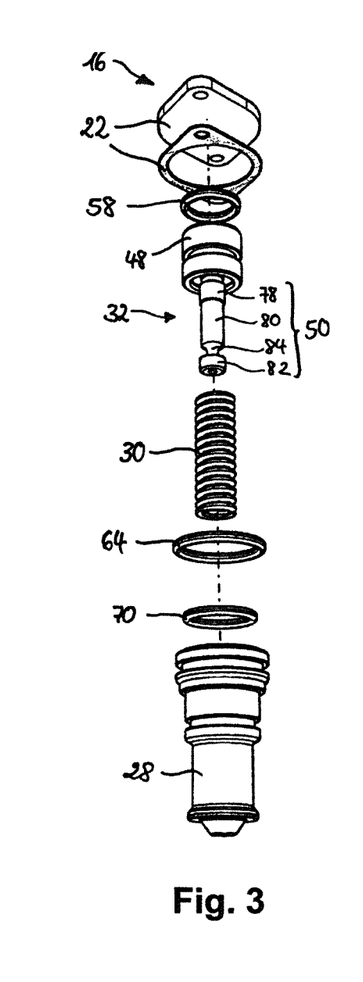
FIG. 3 is an exploded view of the unloader valve assembly according to the first embodiment.
Figure 4:
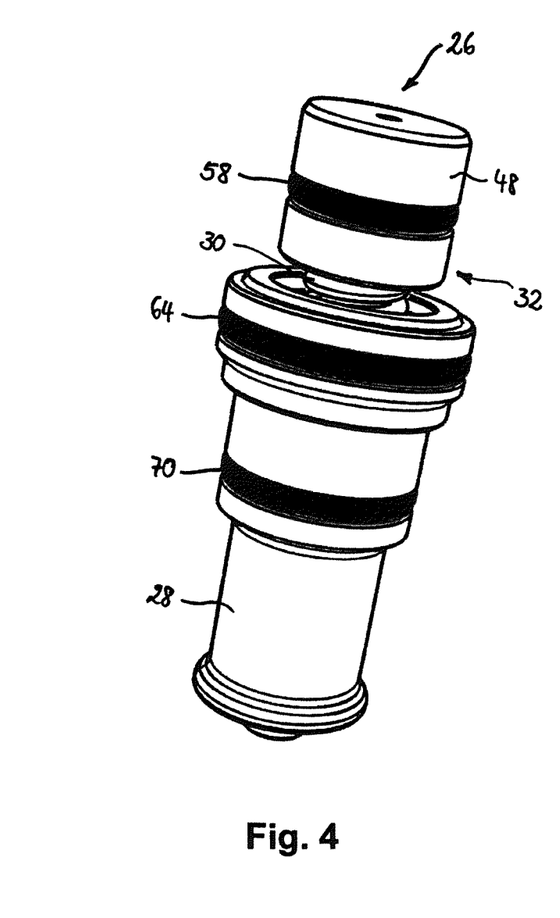
FIG. 4 is a perspective view of the piston assembly according to the first embodiment.
Figure 5:
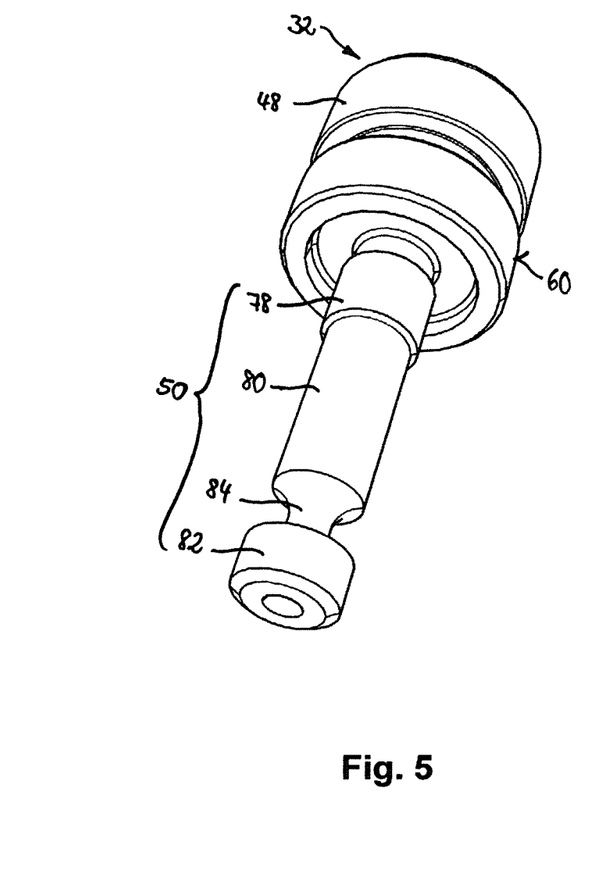
FIG. 5 is a perspective view of a balance piston of the piston assembly according to the first embodiment.

FIGS. 2 to 5 show a first embodiment of the unloader valve assembly 16, wherein FIG. 2 is a sectional view taken along line II-II shown in FIG. 1 of the unloader valve assembly 16, comprising the piston assembly 26 including the balance piston 32 according to the first embodiment, FIG. 3 is an exploded view of the unloader valve assembly 16 as shown in FIG. 2, FIG. 4 is a perspective view of the piston assembly 26 according to the first embodiment, and FIG. 5 is a perspective view of the balance piston 32 according to the first embodiment.

The unloader valve assembly 16 according to the first embodiment comprises a balance piston 32 including the stem portion 50 having an end portion 78 extending from the head portion 48, an intermediate portion 80 and an end portion 82 facing away from the head portion 48. Both end portions 78, 82 have a first diameter and the intermediate portion 80 has a second diameter, which is smaller than the first diameter. Additionally, the intermediate portion 80 comprises a grooved section 84 which is formed next to the end portion 82 facing away from the head portion 48.

The end portions 78, 82 supports the coil spring 30 such that the coil spring 30 cannot buckle, i.e., the coil spring 30 contacts the end portions 78, 82 of the stem portion 50. The diameter of the intermediate portion 80 is set small enough such that the intermediate portion 80 is not in contact with the coil spring 30 but large enough so that the coil spring 30 still cannot buckle. This avoids premature wear of the stem portion 50 of the balance piston 32 and of the spring 30 caused by too low spring clearance. For example, the diameter of both end portions 78, 82 is 9.0 mm and the diameter of the intermediate portion 80 is 7.8 mm. In other words, by providing the intermediate portion 80, the spring clearance is sectionwise increased, for example, from 2.75 mm to 3.75 mm.

When the distance between the end portion 82 facing away from the head portion 48 and a heat source, e.g. the unloading passage 76, is getting too short, the balance piston 32 heats up too much and causes an overheating and burning of the first seal 58 leading to premature wear and/or seizing of the unloader valve assembly 16. The grooved section 84 has a diameter smaller than the diameter of the intermediate portion 80. Such a cross-section constriction acts as a thermal barrier reducing the heat conduction towards the head portion 48 of the balance piston 32 and allows the stem portion 50 to be longer than without the grooved section 84. Further, the end portion 82 facing away from the head portion 48 acts as a heat shield, particularly against thermal radiation but also against convection. By providing the grooved section 84, this effect is intensified.

The length of the stem portion 50 is significant for the support of the coil spring 30—the larger the distance between both end portions 78, 82 of the stem portion (i.e., the longer the intermediate portions 80 extends between both end portions 78, 82) with regard to a (defined) length of the coil spring 30, the better the support of the coil spring 30. This reduces the risk of buckling of the coil spring 30 and thus prevents premature wear between the stem portion 50 and the coil spring 30.

To avoid wear between the unloader piston 28 and the valve plate 18, which can also be referred to as valve seat wear, the diameter of the third bore 44 is made larger with regard to known piston assemblies, e.g. the diameter is increased from 5.0 mm to 6.5 mm. By increasing the diameter of the third bore 44 of the unloader piston 28, it is easier for the air to flow in, which results in less flow resistance which, in turn, reduces vibrating of the unloader piston 28 and thus eliminates premature valve seat wear.

Figure 6:
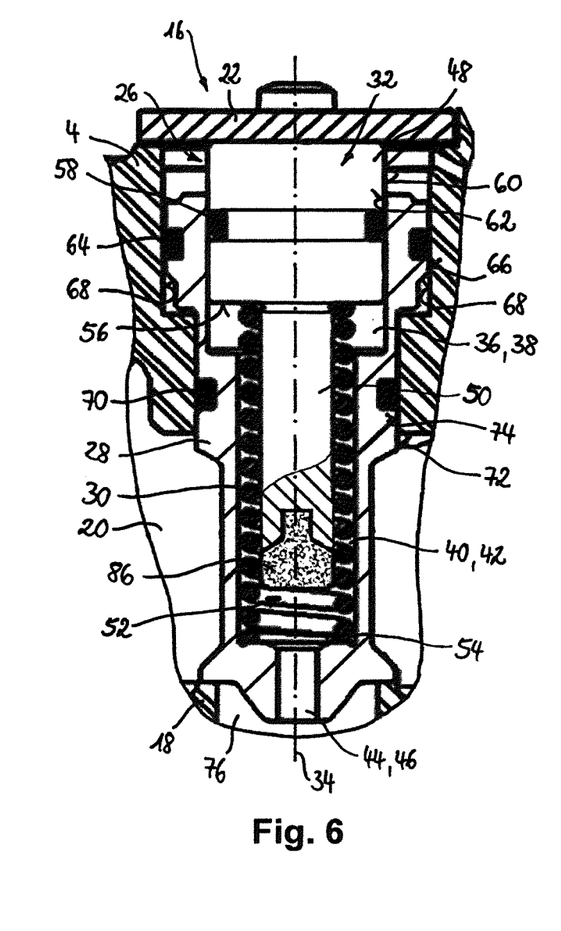
FIG. 6 is a sectional view, taken approximately along line II-II shown in FIG. 1, and showing a second embodiment of the piston assembly for the unloader valve assembly.

FIG. 6 is a sectional view taken approximately along line II-II shown in FIG. 1, and shows the unloader valve assembly 16 according to a second embodiment. Hereinafter, only the differences between the first and second embodiments will be described. Components having a similar or same configuration or function are provided with the same reference signs and their detailed description is omitted.

The main difference between the second embodiment and the first embodiment is the stem portion 50. The stem portion 50 according to the second embodiment comprises a cap 86 made of a high temperature resistant material, e.g., a high temperature resistant plastic, preferably polyether ether ketone (PEEK). The cap 86 is disposed at the end portion 82 facing away from the head portion 48 and acts as a heat shield in a similar or analogue way as the end portion 82 facing away from the head portion 48 according to the first embodiment. The cap 86 may be formed separately and may be attached to the end portion 82 facing away from the head portion 48, e.g., by pinning, clipping, screwing, press-fitting etc., or may be integrally formed with the stem portion 50, e.g., by molding or injection.

Even though the stem portion 50 shown in FIG. 6 neither comprise the grooved section nor the intermediate portion, it is possible to attach a cap 86 also to a stem portion 50 comprising an intermediate portion 80 and/or a grooved section 84.

Figure 7:
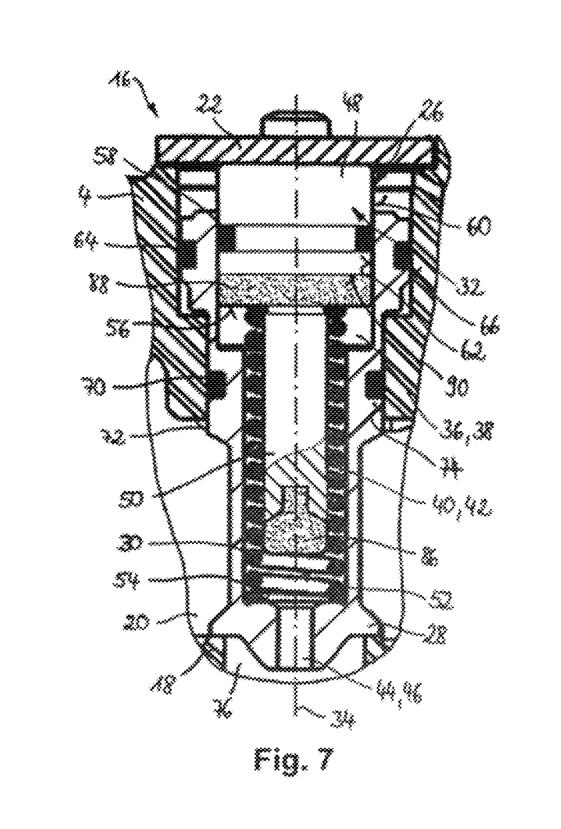
FIG. 7 is a sectional view, taken approximately along line II-II shown in FIG. 1, and showing a third embodiment of the piston assembly for the unloader valve assembly.

FIG. 7 is a sectional view taken approximately along line II-II shown in FIG. 1, and shows the unloader valve assembly 16 according to a third embodiment. Hereinafter, only the differences between the second and the third embodiments will be described. Components having a similar or same configuration or function are provided with the same reference signs and their detailed description is omitted.

The third embodiment corresponds to the second embodiment further comprising a disc 88 made of a high temperature resistant material, e.g., a high temperature resistant plastic, preferably polyether ether ketone (PEEK). The disc 88 is disposed at the head portion 48, namely between one end face 90 of the head portion 48 and the end portion 78 of the stem portion 50 extending from the head portion 48. The disc 88 analogously acts like a heat shield and may be disposed otherwise as long as the disc 88 is disposed between the first seal 58 and the stem portion 50.

Alternatively, it is also possible, that the balance piston 32 of the unloader valve assembly 16 only comprises the cap 86 or the disc 88. Further, it is possible to only provide the disc 88 in combination with a balance piston 32 having an intermediate portion 80 and/or a grooved section 84 as shown in the first embodiment.

Figure 8:
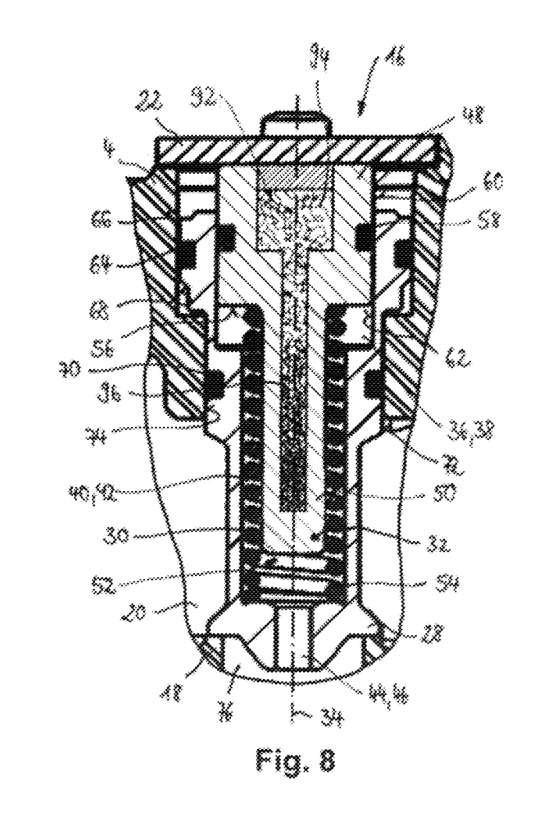
FIG. 8 is a sectional view, taken approximately along line II-II shown in FIG. 1, and showing a fourth embodiment of the piston assembly for the unloader valve assembly.

FIG. 8 is a sectional view taken approximately along line II-II shown in FIG. 1, and shows the unloader valve assembly 16 according to a fourth embodiment. Hereinafter, only the differences between the first and the fourth embodiments will be described. Components having a similar or same configuration or function are provided with the same reference signs and their detailed description is omitted.

The fourth embodiment of the unloader valve assembly 16 comprises a balance piston 32 having a cooling line 92. The cooling line 92 is generally cylindrical and extends from the head portion 48 of the balance piston 32 into the stem portion 50 of the balance piston 32 along the longitudinal central axis 34. The cooling line 92, as shown in FIG. 8, has a first bore 94 of a first diameter and a second bore 96 of a second diameter being smaller than the first diameter. The cooling line 92 is filled with a cooling fluid, such as a coolant or water, and may be connected to a cooling fluid circuit, e.g. the cooling port 12 (shown in FIG. 1). The cooling line 92 cools the balance piston 32 from the inside and thus prevents overheating of the balance piston 32, particularly of the first seal 58.

The stem portion 50 of the balance piston 32 according to the fourth embodiment, as shown in FIG. 8, neither comprises an intermediate portion nor a grooved section. According to an alternative embodiment, the stem portion 50 may comprise an intermediate portion 80.

Figure 9:
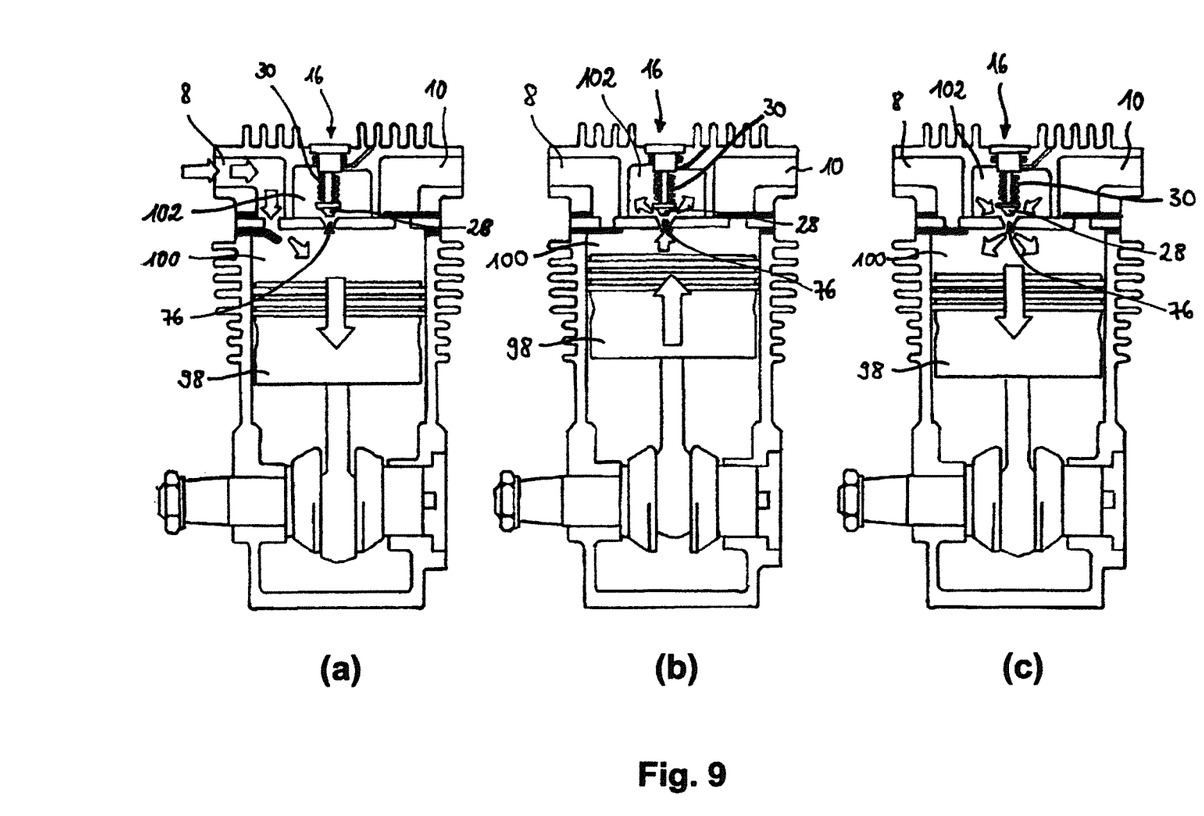
FIG. 9 is an exemplary view showing different states of an air compressor in an unloaded mode.

FIG. 9 shows different phases of an exemplary process of the air compressor 2 being in unloaded mode. In unloaded mode, the unloader piston 28 (depicted simplified) is lifted off the valve seat by a control signal pressure against the biasing force of the coil spring 30 and thus is not blocking the unloading passage 76. FIG. 9 (a) shows a state during an air inlet phase during which a compressor piston 98 draws the air to be compressed through inlets, e.g., air inlet 8 (shown in FIG. 1) into a correlated compression chamber 100 by moving downwards (i.e., increasing the volume of the compression chamber 100).

Referring to FIG. 9 (b), the unloading passage 76 connects the compression chamber 100 with an additional clearance volume 102, into which the air is compressed, when the compressor piston 98 is moving upwards (i.e., decreasing the volume of the compression chamber 100). By connecting the compression chamber 100 with the additional clearance volume 102, the pressure in the compression chamber 100 remains below a pressure level needed to open the air outlet port, e.g., the discharge port 10 (also shown in FIG. 1).

Referring to FIG. 9 (c), compressed air is flowing back from the additional clearance volume 102 into the compression chamber 100 when the compressor piston 98 is moving downwards again (i.e., increasing the volume of the compression chamber 100), thus no fresh air is drawn in through inlets.

The system shown in FIG. 9 may also be referred to as "closed room system". The closed room system connects the compression chamber 100 to a closed space into the cylinder head called "closed room" which corresponds to the additional clearance volume 102. By this, the same air volume is kept.

FIGS. 9 (b) and (c) can be summarized to a so called "ESS phase", wherein ESS stands for "Energy Saving System". During the ESS phase, a considerable amount of energy is saved compared to the idling phase (i.e., unloaded mode of the compressor 2) of a conventional compressor not having such ESS.

The usage of this design with a so-called "open delivery line" is feasible, but the efficiency compared to a so-called "closed delivery line" is reduced. The compatibility is optimum with the closed delivery line.

REFERENCE LIST 2 air compressor
4 compressor cylinder head assembly
6 compressor crankcase assembly
8 air inlet port
10 discharge port
12 coolant port
14 safety valve port
16 unloader valve assembly
18 valve plate
20 cooling plate
22 cover plate
24 screw
26 piston assembly
28 unloader piston
30 coil spring
32 balance piston
34 longitudinal central axis
36 first bore
38 chamber
40 second bore
42 chamber
44 third bore
46 chamber
48 head portion
50 stem portion
52 central opening
54 surface (of the unloader piston)
56 surface (of the balance piston)
58 first seal
60 outer diameter bearing surface
62 inner diameter bearing surface
64 second seal
66 first outer diameter bearing surface
68 first inner diameter bearing surface
70 third seal
72 second outer diameter bearing surface
74 second inner diameter bearing surface
76 unloading passage
78 end portion
80 intermediate portion
82 end portion
84 grooved section
86 cap
88 disc 90 end face
92 cooling line
94 first bore
96 second bore
96 compressor piston
100 compression chamber
102 additional clearance volume

The invention claimed is:

1. A piston assembly for an unloader valve of an air compressor, the piston assembly comprising:
an unloader piston having an end portion with a first bore of a first bore diameter, an intermediate portion with a second bore of a second bore diameter and an opposite end portion with a third bore of a third bore diameter, wherein the first bore diameter is larger than the second bore diameter which, in turn, is larger than the third bore diameter;
a coil spring having a central opening, one end portion disposed in the second bore of the unloader piston and an opposite end portion extending into the first bore of the unloader piston; and
a balance piston including a head portion having a diameter to be disposed in the first bore of the unloader piston, and a stem portion extending from the head portion into the central opening of the coil spring and having a diameter smaller than the diameter of the head portion;
wherein the diameter of the stem portion at an end portion of the stem portion facing away from the head portion substantially corresponds to an inner diameter of the central opening of the coil spring; and
wherein the balance piston includes a heat protection element, wherein the heat protection element comprises a section between an end portion extending from the head portion and the end portion facing away from the head portion, the section being grooved, and a heat shield formed by the end portion facing away from the head portion, the grooved section having a reduced diameter that reduces the heat transfer through the stem portion towards the head portion of the balance piston.

2. The piston assembly according to claim 1, wherein the stem portion further includes an intermediate portion interconnecting the end portion extending from the head portion and the end portion facing away from the head portion, and
both end portions have a first diameter and the intermediate portion of the stem portion has a second diameter which is smaller than the first diameter.

3. The piston assembly according to claim 2, wherein the intermediate portion of the stem portion is at least half and up to 80% of the length of the stem portion.

4. The piston assembly according to claim 1, further comprising:
a first seal configured to provide an air-tight seal between an outer diameter bearing surface of the head portion of the balance piston and an inner diameter bearing surface within the first bore of the unloader piston,
a second seal configured to provide an air-tight seal between a first outer diameter bearing surface of the unloader piston and a first inner diameter bearing surface of a cylinder head of the compressor, and
a third seal configured to provide an air-tight seal between a second outer diameter bearing surface of the unloader piston and a second inner diameter bearing surface of the cylinder head of the compressor.

5. The piston assembly according to claim 1, wherein the inner diameter of the central opening of the coil spring and the diameter of the stem portion form a clearance fit therebetween.

6. The piston assembly according to claim 1, wherein the one end portion of the coil spring abuts a surface of the unloader piston and the opposite end portion of the coil spring abuts a surface of the balance piston.

7. The piston assembly according to claim 1, further comprising:
a cover plate which is disposed on a side of the head portion opposite to the stem portion, wherein
the cover plate is separate from the head portion or integrally formed with the head portion.

8. An unloader valve assembly for an air compressor, the unloader valve assembly comprising:
a piston assembly according to claim 1,
wherein the unloader piston is responsive to a control signal pressure to move the unloader piston against bias of the coil spring and thereby move the unloader piston along its longitudinal central axis from a loaded position in which the unloader piston blocks an associated unloading passage to an unloaded position in which the unloader piston is not blocking the unloading passage.

9. A vehicle air compressor for a heavy vehicle braking system, the vehicle air compressor comprising:
a compressor crankcase assembly;
a compressor cylinder head assembly disposed on the crankcase assembly and co-operating with the crankcase assembly to generate compressed air, wherein the cylinder head assembly includes:
(i) an air inlet port through which air is receivable for compression within the crankcase and cylinder head assemblies,
(ii) a discharge port through which compressed air is deliverable from the cylinder head assembly; and
(iii) an unloading passage; and
an unloader valve assembly according to claim 8,
wherein the unloader valve assembly is connected internally of the crankcase and cylinder head assemblies, and
wherein the unloader piston is movable against the biasing force of the coil spring between the loaded position in which compressed air is blocked from leaving the unloading passage as compressed air is being delivered through the discharge port and the unloaded position in which compressed air is allowed to be unloaded from the crankcase and cylinder head assemblies.

10. A piston assembly for an unloader valve of an air compressor, the piston assembly comprising:
an unloader piston having an end portion with a first bore of a first bore diameter, an intermediate portion with a second bore of a second bore diameter and an opposite end portion with a third bore of a third bore diameter, wherein the first bore diameter is larger than the second bore diameter which, in turn, is larger than the third bore diameter;
a coil spring having a central opening, one end portion disposed in the second bore of the unloader piston and an opposite end portion extending into the first bore of the unloader piston; and
a balance piston including a head portion having a diameter to be disposed in the first bore of the unloader piston, and a stem portion extending from the head portion into the central opening of the coil spring and having a diameter smaller than the diameter of the head portion;

wherein the diameter of the stem portion at an end portion of the stem portion facing away from the head portion substantially corresponds to an inner diameter of the central opening of the coil spring; and wherein the balance piston comprises a heat protection element, wherein the heat protection element comprises a cap made of a high temperature resistant material at the end portion facing away from the head portion, of the cap being attached to the end portion facing away from the head portion by being clipped, screwed, bonded, press-fitted or integrally formed with the end portion facing away from the head portion, and wherein the cap is made of a different material than the stem portion of the balance piston.

11. The piston assembly according to claim 10, wherein the high temperature resistant material is a high temperature resistant plastic.

12. The piston assembly according to claim 10, wherein an intermediate portion of the stem portion is at least half and up to 80% of the length of the stem portion.

13. A piston assembly for an unloader valve of an air compressor, the piston assembly comprising:

an unloader piston having an end portion with a first bore of a first bore diameter, an intermediate portion with a second bore of a second bore diameter and an opposite end portion with a third bore of a third bore diameter, wherein the first bore diameter is larger than the second bore diameter which, in turn, is larger than the third bore diameter;

a coil spring having a central opening, one end portion disposed in the second bore of the unloader piston and an opposite end portion extending into the first bore of the unloader piston; and a balance piston including a head portion having a diameter to be disposed in the first bore of the unloader piston, and a stem portion extending from the head portion into the central opening of the coil spring and having a diameter smaller than the diameter of the head portion;

wherein the diameter of the stem portion at an end portion of the stem portion facing away from the head portion substantially corresponds to an inner diameter of the central opening of the coil spring; and wherein the balance piston includes a heat protection element, wherein the heat protection element comprises a cooling line integrated into the balance piston, the cooling line being co-axially arranged in the balance piston and extending through the head portion and into the stem portion, wherein the cooling line has a closed end disposed in the stem portion such that the cooling line does not extend through the entirety of the stem portion.

14. The piston assembly according to claim 13, wherein the cooling line is filled with a cooling fluid.

* * * * *